United States Patent
Marangon (10) Patent No.: US 10,442,499 B2
(45) Date of Patent: Oct. 15, 2019

(54) ACTUATION DEVICE FOR THE CONTROL CABLE OF A BICYCLE GEARSHIFT

(71) Applicant: CAMPAGNOLO S.r.l., Vicenza (IT)

(72) Inventor: Christian Marangon, Thiene (VI) Vicenza (IT)

(73) Assignee: CAMPAGNOLO S.r.l., Vicenza (IT)

( * ) Notice: Subject to any disclaimer, the term of this patent is extended or adjusted under 35 U.S.C. 154(b) by 85 days.

(21) Appl. No.: 15/608,279

(22) Filed: May 30, 2017

(65) Prior Publication Data

US 2017/0341709 A1    Nov. 30, 2017

(30) Foreign Application Priority Data

May 31, 2016  (IT) .............................. UA2016A4005

(51) Int. Cl.

| | |
|---|---|
| *B62M 25/02* | (2006.01) |
| *B62M 11/04* | (2006.01) |
| *B62K 23/02* | (2006.01) |
| *B62L 3/02* | (2006.01) |
| *B62M 25/04* | (2006.01) |
| *B62K 23/06* | (2006.01) |

(52) U.S. Cl.
CPC ............. *B62M 25/04* (2013.01); *B62K 23/06* (2013.01); *B62M 11/04* (2013.01); *B62L 3/02* (2013.01)

(58) Field of Classification Search
CPC ...... B62M 11/04; B62M 25/02; B62M 25/04; B62M 25/045; B62K 23/02; B62K 23/06; B62L 3/02
See application file for complete search history.

(56) References Cited

U.S. PATENT DOCUMENTS 5,094,120 A * 3/1992 Tagawa .................. B62M 25/04
                                                            74/141.5
5,615,580 A    4/1997 Chen et al.
(Continued)

FOREIGN PATENT DOCUMENTS

| CN | 203381765 U | 1/2014 |
|---|---|---|
| EP | 1564131 A1 | 8/2005 |
| EP | 1749738 A1 | 2/2007 |

OTHER PUBLICATIONS

Italian Search Report and Written Opinion in Italian Application No. UA2016A004005, dated Jan. 26, 2017, with English translation.

*Primary Examiner* — Adam D Rogers
(74) *Attorney, Agent, or Firm* — Volpe and Koenig, P.C.

(57) ABSTRACT

An actuation device of a control cable of a bicycle gearshift including a cable-winding bush rotatable about a rotation axis in a first angular direction between a first and a last angular position and in a second angular direction between the last and the first angular position, a rotary member mounted in a rotary manner about the rotation axis and a stationary member mounted in a non-rotary manner, wherein one of the two members is provided with at least one first pointer engaged on a fastening track formed on the other member, the fastening track extending along a closed loop path and having at least one first plurality of stop positions engageable in sequence by the pointer. A first stop position that determines the first angular position of the cable-winding bush is angularly spaced from the next stop position by an indexing angle.

17 Claims, 4 Drawing Sheets

(56) References Cited

U.S. PATENT DOCUMENTS

| | | | |
|---|---|---|---|
| 7,461,573 B2* | 12/2008 | Dal Pra | B62K 23/06 |
| | | | 74/502.2 |
| 10,040,512 B2* | 8/2018 | Minto | B62M 25/04 |
| 2018/0154983 A1* | 6/2018 | Marangon | B62M 9/1242 |
| 2018/0229805 A1* | 8/2018 | Minto | B62M 9/134 |
| 2018/0229806 A1* | 8/2018 | Marangon | B62K 23/06 |

\* cited by examiner

ACTUATION DEVICE FOR THE CONTROL CABLE OF A BICYCLE GEARSHIFT

CROSS REFERENCE TO RELATED APPLICATION(S)

This application claims the benefit of Italian Application No. UA2016A004005, filed on May 31, 2016, which is incorporated herein by reference as if fully set forth.

FIELD OF INVENTION

The present invention relates to an actuation device for the control cable of a bicycle gearshift, adapted for being mounted at bicycle handlebars. Preferably, the bicycle is a racing bicycle.

BACKGROUND

A bicycle is normally provided with a rear derailleur active on a cog set, which consists of a series of coaxial toothed wheels (sprockets) of different diameters and numbers of teeth coupled with the hub of the rear wheel.

A bicycle can also be provided with a front derailleur associated with a crankset, which consists of a series of toothed wheels (ring gears) of different diameters and numbers of teeth associated with a pin of the bottom bracket set in rotation by a pair of pedals.

In both cases, the derailleur engages a transmission chain extending in a closed loop between the cog set and the crankset, moving it on toothed wheels of different diameter and number of teeth, so as to obtain different gear ratios.

In particular, downward gearshifting is said when the chain passes from a toothed wheel of larger diameter to a toothed wheel of smaller diameter, and upward gearshifting is said when the chain moves from a toothed wheel of smaller diameter to a toothed wheel of larger diameter. It should be noted on this point that with reference to the rear derailleur, downward gearshifting corresponds to the passage to a higher gear ratio and upward gearshifting corresponds to the passage to a lower gear ratio.

The movement in the two directions of the rear derailleur is obtained through an actuation device mounted on the handlebars so as to be easily maneuvered by the cyclist.

More in particular, in a mechanical gearshift, the rear derailleur is moved among the toothed wheels of the cog set, in a first direction by a traction action exerted by an inextensible control cable that is normally sheathed (commonly called Bowden cable), in a second opposite direction by the release of the traction of the cable and by the elastic return action of a spring provided in the derailleur itself.

The movement of the rear derailleur is obtained according to an articulated parallelogram linkage wherein the sides of the parallelogram are articulated two-by-two with respect to each other, along respective substantially parallel rotation axes, through pins. In particular, such an articulated parallelogram is formed from a support body, intended to remain fixed with respect to the frame, a so-called chain guide adapted for moving the chain between different engagement positions on the toothed wheels, and a pair of articulation arms or connecting rods (generally identified as outer connecting rod and inner connecting rod), which connect the chain guide to the support body in a mobile manner.

The traction or release of the control cable determine respective rotations of the connecting rods with the consequent movement of the chain guide that faces the desired toothed wheel for precise gearshifting.

Normally, the direction in which the movement is caused by the release of the traction of the cable and by the return spring is that of downward gearshifting; vice-versa, the traction action of the control cable takes place in the direction of upward gearshifting, wherein the chain moves from a toothed wheel of smaller diameter to a toothed wheel of larger diameter.

In the actuation device, the control cable is actuated in traction or in release through winding and unwinding on a rotor element, commonly called cable-winding bush, the rotation of which is actuated by the cyclist with a suitable control lever, or with two control levers (a first lever for upward gearshifting and a second lever for downward gearshifting).

In any case, the actuation device must foresee that the cable-winding bush is held immobile in rotation in a number of predetermined angular positions, angularly spaced apart by predetermined indexing angles and corresponding to the different positions of the derailleur required by the different ratios, i.e. on the different toothed wheels of the gearshift. This function is obtained with the so-called indexers, many types of which are known in the prior art, variously active between the cable-winding bush and the fixed casing of the device.

One type of widely-used indexer comprises an indexing bush and a so-called ball-holding disc the interaction of which leads to the predetermined angular positions of the cable-winding bush being stably reached.

In particular, the ball-holding disc and the indexing bush are fitted onto a control shaft set in rotation by the control lever actuated by the cyclist. The ball-holding disc and the cable-winding bush are constrained in rotation to the control shaft, whereas the indexing bush is fixed and does not rotate as a unit with the control shaft.

On the indexing bush there is a recess that engages and acts as a guide for a ball carried by the ball-holding disc. Such a ball is mobile with respect to the ball-holding disc in the radial direction, so as to be able to engage and follow the recess during the relative rotation between ball-holding disc and indexing bush. The recess is formed from a track that extends substantially circumferentially on the indexing bush equipped with sliding areas in which the ball slides alternated by stop areas in which the ball finds sliding stop positions. The stop areas are angularly spaced apart by angles coinciding with the indexing angles of the cable-winding bush.

In order to carry out upward gearshifting, the cyclist actuates the relative control lever and the control shaft is set in rotation making the ball of the ball-holding disc cross a sliding area of the recess of the indexing bush until it reaches a stop area at which it stops. Such sliding of the ball with respect to the indexing bush corresponds to a rotation of the ball-holding disc and, therefore, of the cable-winding bush. The winding of the control cable on the cable-winding bush determines a rotation of the connecting rods of the rear derailleur that positions the chain exactly at the toothed wheel of immediately greater diameter allowing precise gearshifting.

Similarly, in order to carry out downward gearshifting, the cyclist actuates the relative control lever and the control shaft is set in rotation taking the ball of the ball-holding disc in the stop area immediately before in which it stops. Such a rotation of the ball-holding disc corresponds to a rotation of the cable-winding bush that unwinds the control cable. The release of the control cable determines a rotation of the connecting rods of the rear derailleur that positions the chain exactly at the toothed wheel of immediately smaller diameter allowing precise gearshifting.

Since for the same traction of the control cable the connecting rods of the rear derailleur perform decreasing rotations as the deformation of the articulated quadrilateral increase, in other words increasing with gearshifting operations, and since the cog sets can have the toothed wheels not equally spaced along the axis of the hub of the wheel, the indexing angles of the cable-winding bush, and therefore the angular distances between the stop areas in the indexing bush, are not all the same as each other.

For this reason, the stop areas in the recess of the indexing bush are angularly spaced so that a predetermined angular distance between two stop areas corresponds to a predetermined gearshifting operation, upward or downward, between two predetermined toothed wheels of the cog set.

The Applicant has noted that by increasing the number of toothed wheels of the cog set it is possible to increase the number of gear ratios to the point such as to also be able to hypothesize using a single crankset on the pedal axle, with clear advantages in terms of weight and reliability.

The Applicant has, however, found that the actuation devices of the type summarily described above can be subject to the drawback of limiting the number of toothed wheels able to be used in the cog set.

The Applicant has indeed found that a larger number of toothed wheels in the cog set requires a greater excursion of the rear derailleur that is reflected in a greater stroke of the control cable.

The radial space around the control pin is, however, limited by the bulk of the casing that contains the actuation device (which is mainly dictated by ergonomic reasons), and therefore the diameter of the cable-winding bush cannot be increased as desired to obtain, for the same angular rotation of the cable-winding bush dictated by the rotation of the ball-holding disc, an increase in the stroke of the control cable.

Furthermore, in order to give greater stability and better distribution of the forces inside the actuation device, there are usually two balls of the ball-holding disc and they are diametrically opposite at 180°, each of which engages a respective recess on the indexing bush. In this case, the stop areas are replicated on both of the recesses and are point-for-point diametrically opposite along the circumferential extension of the indexing bush.

The Applicant has noted that in indexers having two balls and two recesses, which ensure high reliability of operation, the useful stroke for the control cable is even limited by a rotation of 180°, or less, of the cable-winding bush.

SUMMARY

The present invention therefore relates to an actuation device for the control cable of a bicycle gearshift
comprising:
a casing, configured for fixing to bicycle handlebars,
a cable-winding bush mounted in the casing, angularly rotatable about a rotation axis in a first angular direction between a first angular position and a last angular position and in a second angular direction between the last angular position and the first angular position,
a rotary member mounted in the casing in a rotary manner about the rotation axis and a stationary member mounted in a non-rotary manner in the casing, wherein one from the rotary member and the stationary member is provided with at least one first pointer engaged on a fastening track formed on the other member,
the fastening track extending along a closed loop path and comprising at least one first plurality of stop positions engageable in sequence by said pointer, the cable-winding bush passing from one angular position to an adjacent angular following the passage of the pointer from a stop position to an adjacent stop position,
each stop position being angularly spaced from an adjacent stop position by a respective indexing angle, each indexing angle corresponding to a rotation of the cable-winding bush by an amount equal to the indexing angle,
a first stop position that determines the first angular position of the cable-winding bush being angularly spaced from the next stop position by an indexing angle equal to the indexing angle necessary to make the cable-winding bush rotate from the penultimate angular position to the last angular position.

The term "next" referring to a stop position, in the present description and in the subsequent claims, is meant to indicate a stop position that immediately follows another stop position along the first angular direction.

Rotations of the cable-winding bush in the first angular direction correspond to upward gearshifting whereas rotations of the cable-winding bush in the second angular direction correspond to downward gearshifting.

The fastening track that extends along a closed loop makes it possible to obtain a succession of recursive stop positions, in other words in which the stop positions can be crossed by the pointer, in the same direction of rotation and at least in theory, an infinite number of times.

Therefore, the first stop position can be engaged twice by the pointer, in other words a first time when the cable-winding bush is in the first position and furthermore when the pointer goes from the last stop position back to the first stop position.

The first stop position, which determines the first angular position of the cable-winding bush, corresponds to a position of the rear derailleur at the smallest toothed wheel of the cog set. The last angular position of the cable-winding bush corresponds to a position of the rear derailleur substantially at the largest toothed wheel of the cog set.

The Applicant has noted that the indexing angle necessary for gearshifting between the smallest toothed wheel and the next one of the cog set is smaller than the indexing angle for gearshifting between the previous toothed wheel and the larger one of the cog set. This is because the stroke of the control cable must be wider in the last upward gearshifting operation, in other words gearshifting between the two largest toothed wheels of the cog set, with respect to the stroke in the first upward gearshifting operation, in other words gearshifting between the two smallest toothed wheels of the cog set.

The Applicant has perceived that by setting the angular distance between the first stop position and the next stop position equal to the indexing angle necessary to make the cable-winding bush rotate from the penultimate angular position to the last angular position it is possible to use the stop position after the first to also obtain the last upward gearshifting. The stop position after the first is also used to carry out the first upward gearshifting.

In this way, the number of angular positions that can be reached by the cable-winding bush is increased, allowing an increase in the number of toothed wheels on which the rear derailleur can operate.

In accordance with the invention, the number of angular positions that can be reached by the cable-winding bush is equal to the number of stop positions physically distinct from one another plus two.

The Applicant has perceived that, in accordance with the present invention, the first angular position of the cable-winding bush would tend to unwind the control cable more than what is necessary to obtain the last downward gear-shifting (the gearshifting that takes the transmission chain onto the smallest toothed wheel of the cog set) and therefore to make the derailleur perform an unnecessary extra stroke.

However, the Applicant has noted that by acting on the end stop adjustment of the rear derailleur that limits the angular excursion thereof in the last downward gearshifting, it is possible to stop the extra stroke of the rear derailleur and prevent the last downward gearshifting from moving the transmission chain beyond the smallest toothed wheel.

The actuation device for the control cable of a bicycle gearshift of the present invention can comprise one or more of the following preferred features, individually or in combination.

In the casing configured for fixing to bicycle handlebars there is a central pin, fixed with respect to the casing and extending along an axis. Such an axis is the main reference axis for the elements that form part of the device of the present invention; all of the indications of direction and similar, such as "axial", "radial", "circumferential" and "diametral" will be made with respect to it; equally, the indications "outwards" and "inwards" referring to radial directions should be understood as away from the axis or towards the axis. About the axis, two opposite angular directions are also defined. Preferably, such an axis coincides with the rotation axis of the cable-winding bush.

Preferably, the indexing angles between two consecutive stop positions are different from each other.

In this way, it is possible to use the actuation device of the present invention in combination both with derailleurs in which, for the same stroke of the control cable, the rotation angle of the connecting rods changes as the angular excursion thereof increases both with cog sets in which the distance that separates two consecutive toothed wheels is not constant, and with a combination of the two.

Preferably, the indexing angles between two consecutive stop positions after the first stop position increase evenly.

In other words, the stop positions encountered during upward gearshifting are angularly spaced by angles of increasing size going upwards with the gearshifting operations starting from the second gearshifting operation. As stated above, the indexing angle of the last upward gearshifting operation coincides with the indexing angle of the first upward gearshifting operation. This indexing angle is preferably the largest of all.

In the preferred embodiment of the invention, said member provided with at least one pointer comprises a second pointer angularly spaced by 180° from the first pointer;

the fastening track comprises a second plurality of stop positions that are the same as and point-for-point diametrically opposite the stop positions of the first plurality of stop positions, the cable-winding bush passing from one angular position to an adjacent angular position following the substantial simultaneous passage of each pointer from one stop position to an adjacent stop position, each stop position of the first and of the second plurality of stop positions being angularly spaced from an adjacent stop position by a respective indexing angle, a first stop position of the first and of the second plurality of stop positions, which determines the first angular position of the cable-winding bush, being angularly spaced from the respective next stop position by an indexing angle equal to the indexing angle necessary to make the cable-winding bush rotate from the penultimate angular position to the last angular position.

Therefore, identical stop positions are angularly spaced by 180° and engaged by two pointers themselves also angularly spaced by 180°. In this way, the distribution of forces transmitted between the pointers and the fastening track is spread optimally, increasing the reliability of the device and the precision of operation.

The number of stop positions of the first plurality of stop positions is equal to the number of stop positions of the second plurality of stop positions and is equal to the number of angular positions of the cable-winding bush minus two.

This makes it possible to have two further angular positions of the cable-winding bush, and therefore of the rear derailleur, with respect to the number of physically distinct stop positions present in the first plurality of stop positions and in the second plurality of stop positions.

As an example, in the case in which the stop positions of the first plurality of stop positions (and of the second plurality of stop positions) are nine in number, the angular positions of the cable-winding bush are eleven in number.

In this way, the total angular excursion of the cable-winding bush is greater than the total angular excursion given by the sum of the indexing angles that separate the physically distinct stop positions of the first and of the second plurality of stop positions.

In the preferred embodiment of the invention, the second plurality of stop positions follows and precedes the first plurality of stop positions, so that the last stop position of the first plurality is followed by the first stop position of the second plurality of stop positions and so that the last stop position of the second plurality follows the first stop position of the first plurality of stop positions.

The fastening track is configured according to a closed loop path so as to allow the two pointers, when positioned at the last stop position of the first and second plurality of stop positions, respectively, to pass into the first stop position and the second stop position, respectively, of the first plurality of stop positions.

The indexing angle that separates the last stop position of the first and second plurality of stop positions from the first stop position of the second and first plurality of stop positions is equal to the rotation angle necessary to rotate the cable-winding bush from the third from last angular position to the penultimate angular position.

In accordance with the preferred embodiment of the invention, the total angular excursion of the first and of the second plurality of angular positions is equal to 180° minus the indexing angle corresponding to the passage from the third from last angular position to the penultimate angular position of the cable-winding bush. The total excursion of the cable-winding bush is equal to 180° plus the indexing angle necessary to make the cable-winding bush rotate from the penultimate angular position to the last angular position.

Preferably, the first plurality of stop positions is identified from a first stop position spaced from the next by an indexing angle equal to the indexing angle necessary to take the cable-winding bush from the penultimate to the last angular position, in other words that corresponding to the passage from the penultimate to the last toothed wheel of the cog set during an upward gearshifting operation.

Similarly, the second plurality of stop positions is identified from a first stop position spaced from the next by an indexing angle equal to the indexing angle necessary to take the cable-winding bush from the penultimate to the last angular position, in other words that corresponding to the passage from the penultimate to the last toothed wheel of the cog set during an upward gearshifting operation.

The preferred features of the invention that follow (both considered individually and in combination) can refer to the preferred embodiment, to other embodiments or to all of the embodiments; the context will make it clear to which embodiments such preferred features are to be applied.

Preferably, the device comprises a first end stop to prevent the rotation of the cable-winding bush in the first angular direction beyond the last angular position.

This feature makes it possible to avid an extra stroke of the cable-winding bush not useful for performing further upward gearshifting operations, since the last angular position of the cable-winding bush positions the rear derailleur at the largest toothed wheel of the cog set.

Preferably, the device comprises a second end stop to prevent the rotation of the cable-winding bush in the second angular direction beyond the angular position.

In this way, an extra stroke of the cable-winding bush not useful for performing further downward gearshifting operations is avoided, since the first angular position of the cable-winding bush positions the rear derailleur at the smallest toothed wheel of the cog set.

Preferably, a maneuvering mechanism operative on the cable-winding bush is provided to rotate it in the first angular direction, said first end stop and said second end stop being active on said maneuvering mechanism.

The maneuvering mechanism that sets the cable-winding bush in rotation in the first angular direction, to which upward gearshifting operations correspond, cannot be actuated any further when the cable-winding bush is in the last angular position.

In this way, the cyclist has an immediate perception of having completed the last upward gearshifting operation and furthermore avoids pointless actuations of the maneuvering mechanism in the attempt to perform further upward gearshifting operations.

Preferably, the maneuvering mechanism comprises:

a first control lever, angularly mobile about the rotation axis in the first angular direction between a rest position and an active position, and angularly mobile about the rotation axis in the second angular direction between the active position and the rest position, an engagement bush rotating as a unit with the cable-winding bush and on which said first control lever acts, said first control lever rotating as a unit with said engagement bush in the passage from the rest position to the active position and being freely rotatable with respect to said engagement bush in the passage from the active position to the rest position.

The first control lever thus makes it possible to rotate the cable-winding bush in the first angular direction performing upward gearshifting operations.

Preferably, elastic members are active between the first control lever and the casing, wherein said elastic members tend to bring the first control lever back into the rest position. Such elastic members can be a simple ring torsion spring, mounted in the casing coaxially to the rotation axis and constrained at one end to the casing and at the other end to the first control lever.

Preferably, said first end stop comprises a first projection arranged on said engagement bush that interferes with a shoulder fixedly connected to said casing when the cable-winding bush is in the last angular position, so as to prevent a rotation of the engagement bush in the first angular direction.

In this way, the rotation of the first control lever, which is as a unit with the engagement bush in rotations in the first angular direction, also cannot rotate in the first angular direction when the cable-winding bush is in the last angular position.

Preferably, said second end stop comprises a second projection arranged on said engagement bush that abuts the control lever when the cable-winding bush is in the first angular position, so as to prevent a rotation of the engagement bush in the second angular direction.

Preferably, the maneuvering mechanism comprises a second control lever that acts on the cable-winding bush to allow a rotation thereof in the second angular direction so as to obtain downward gearshifting.

Preferably, said fastening track comprises a plurality of loops, which define said plurality of stop positions of the first and of the second plurality of stop positions, and a plurality of free sliding paths each of which extends between two consecutive loops.

The free sliding paths comprise a first substantially rectilinear portion that extends radially and a second substantially rectilinear portion extending radially that joins the first portion to a loop.

Preferably, the extension of said first portions of the free sliding paths is proportional to the size of the indexing angles.

Preferably, the device comprises a ball-holding disc comprising a first and a second substantially rectilinear throat extending radially and angularly separated by 180°, the first and second throat slidably receiving a respective pointer.

Preferably, each throat houses an elastic member active on the pointer to push it radially outwards. The pointer moves back, in contrast to the elastic force exerted by the elastic member to follow the fastening track.

Preferably, the first and the second pointer emerge axially from said throats to slidably engage said fastening track.

Preferably, said fastening track is formed on said stationary member and said mobile member comprises the ball-holding disc on which said pointers are slidably provided. The stationary member is preferably a substantially disc-shaped indexing bush on a surface of which the fastening track is formed. In this way, the ball-holding disc rotates on the indexing bush making the pointers slide in portions of the track until a stop position is reached.

BRIEF DESCRIPTION OF THE DRAWING(S)

Further features and advantages of the invention will become clearer from the following description of preferred embodiments thereof, made with reference to the attached drawings. In such drawings.

DETAILED DESCRIPTION OF THE PREFERRED EMBODIMENT(S)

With reference to the attached figures, a preferred embodiment of an actuation device for the control cable (not shown) for the gearshift of a bicycle in accordance with the present invention is shown. The actuation device is wholly indicated with 10.

Figure 4:
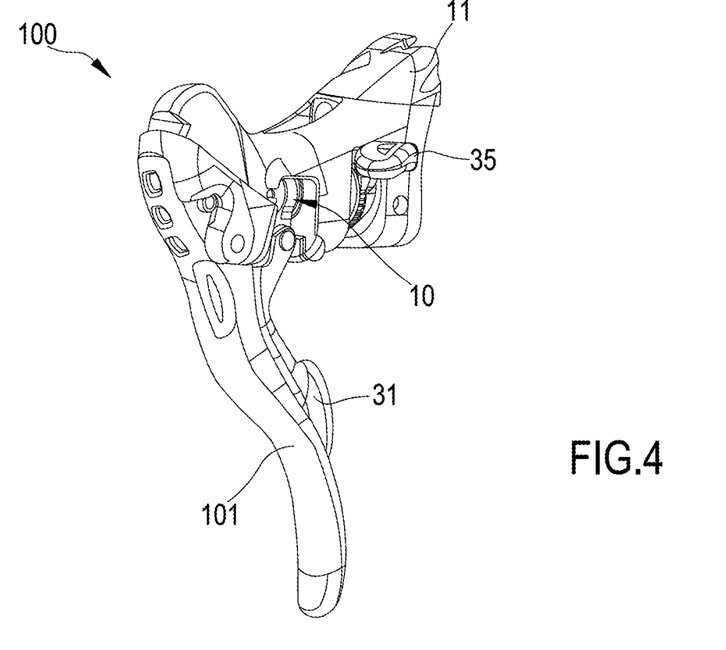
FIG. 4 is a perspective view of a brake-gearshift group incorporating the device of FIG. 1.

Preferably, the actuation device 10 is included in an integrated brake-gearshift actuation device 100 of the bicycle, as for example shown in FIG. 4.

The attached figures show the actuation device 10 of the control cable used to change the gear ratios on a cog set 200 (illustrated as an example in FIG. 3) through a rear derailleur of the bicycle, on which the present invention maximizes its efficiency, even if the present invention can also be used in combination with a front derailleur.

The device 10 comprises a casing 11, which is fixed to the handlebars of a bicycle in a conventional manner, for example through a strap (not illustrated) that preferably also constrains a brake lever 101 to the handlebars.

In the casing 11 a central pin 12 is provided, rotatable inside the casing 11 about a rotation axis X. The rotation axis X (as will become clearer hereinafter) is the main reference axis for the elements that are part of the device 10; all of the indications of direction and similar, such as "axial", "radial", "circumferential" and "diametral" will refer to it; equally, the indications "outwards" and "inwards" referring to radial directions should be considered as away from the rotation axis X or towards the rotation axis X. About the rotation axis X, two opposite angular directions are defined—a first A and a second angular direction B, respectively.

The device 10 comprises a cable-winding bush 13, to which the control cable is fixed and on which it is wound. The cable-winding bush 13 is mounted in the casing 11 and is angularly rotatable about the rotation axis X in the first angular direction A and in the second angular direction B. The cable-winding bush 13 can rotate between a first angular position, in which the winding of the control cable is minimum, and a last angular position, in which the winding of the control cable is maximum, and vice-versa.

Between the first angular position and the last angular position of the cable-winding bush 13 there are further intermediate angular positions that are mutually distinct and angularly spaced by indexing angles C. The indexing angles C are not all identical to each other. Preferably, the indexing angles C are all different from one another. Each angular position of the cable-winding bush 13 corresponds to an angular position of the rear derailleur that positions the transmission chain on a predetermined toothed wheel 201, 202, 203, 204, 205, 206, 207, 208, 209, 210, 211 of the cog set 200.

Figure 3:
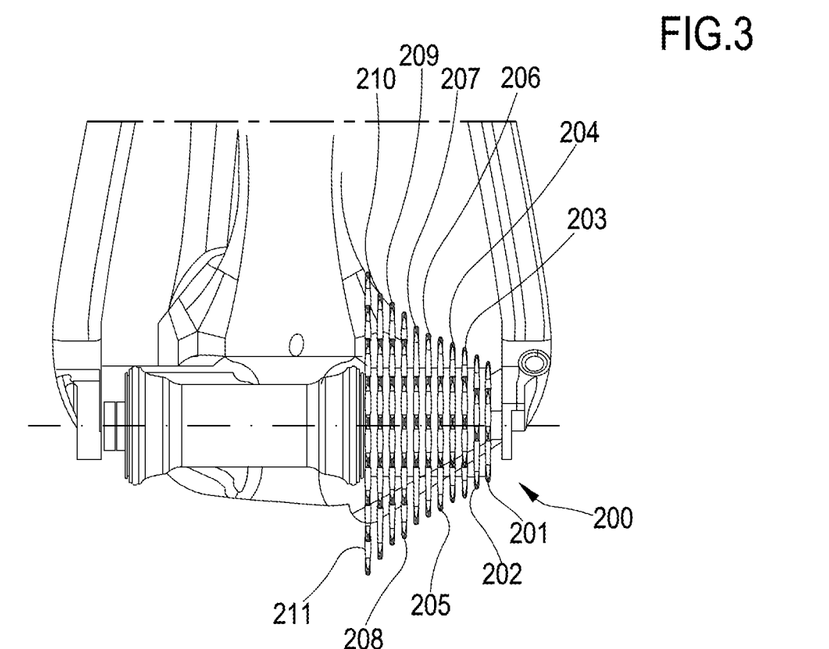
FIG. 3 is a rear view of a cog set on which the device of FIG. 1 can act.

In particular, the first angular position of the cable-winding bush 13 corresponds to a positioning of the transmission chain at the smallest toothed wheel 201 of the cog set 200. The last angular position of the cable-winding bush 13 corresponds to a positioning of the transmission chain at the largest toothed wheel 211 (in other words with the greatest diameter) of the cog set 200.

The intermediate angular positions of the cable-winding bush 13 correspond to positionings of the transmission chain at respective toothed wheels arranged between the smallest 201 and the largest 211 of the cog set 200.

The cable-winding bush 13 rotates as a unit with the central pin 12.

The device 10 further comprises a rotary member 14 mounted in the casing 11 in a rotary manner about the rotation axis X. The rotary member 14 is fixedly connected to the pin 12 and each rotation of the rotary member 14 corresponds to an identical rotation of the cable-winding bush 13. Preferably, the rotary member 14 is a substantially cylindrical ball-holding disc 14-1 equipped with a first pointer 15 and a second pointer 16. The two pointers 15, 16 are preferably spherical bodies and, hereinafter in the present description they will be called pointers or balls without distinction.

In the ball-holding disc 14-1, two radial throats 17 are formed that are closed towards the outside, the same and diametrically opposite, in each of which a respective ball 15, 16 is housed in a mobile manner. The two balls 15, 16 are elastically biased outwards in the throats 17 by respective springs (not illustrated) mounted in the throats 17. Alternatively, the balls 15, 16 are biased towards the outside of the throats 17 by leaf springs mounted in the ball-holding disc 14-1. In both cases the springs position the balls 15, 16 at the radial end of the respective throat 17. The throats 17 are open on one side of the ball-holding disc so that the balls partially emerge from the axial bulk of the ball-holding disc 14-1, making pointers projection in the axial direction.

Inside the casing 11 a stationary member 18 provided with a fastening track 19 is also mounted in a non-rotary manner, fixed with the casing 11 itself. The stationary member 18 is preferably an indexing bush. The two pointers 15, 16 are engaged on the fastening track 19.

The fastening track 19 extends along a closed loop path that directly faces the ball-holding disc 14-1 so that the pointers 15, 16 engage the fastening track 19. The depth of the fastening track 19 is such as to receive the portion of pointers 15, 16 that emerges axially from the ball-holding disc 14-1.

The fastening track 19 comprises a first plurality of stop positions 20 and a second plurality of stop positions 21. The stop positions 20, 21 are engageable in sequence by the two pointers 15, 16.

The stop positions 20, 21 determine stable positions of the pointers along the fastening track 19.

The second plurality of stop positions 21 follows and precedes the first plurality of stop positions 20, so that the last stop position 20c of the first plurality 20 is followed by the first stop position 21a of the second plurality of stop positions 21 and so that the last stop position 21c of the second plurality 21 follows the first stop position 20a of the first plurality of stop positions 20.

The closed loop path of the fastening track is such as to allow the two pointers 15, 16, when positioned at the last stop position 20c, 21c of the first plurality of stop positions 20 and of the second plurality of stop positions 21, respectively, to pass into the first stop position 21a, 20a of the second 21 and of the first plurality of stop positions 20, respectively.

Figure 5:
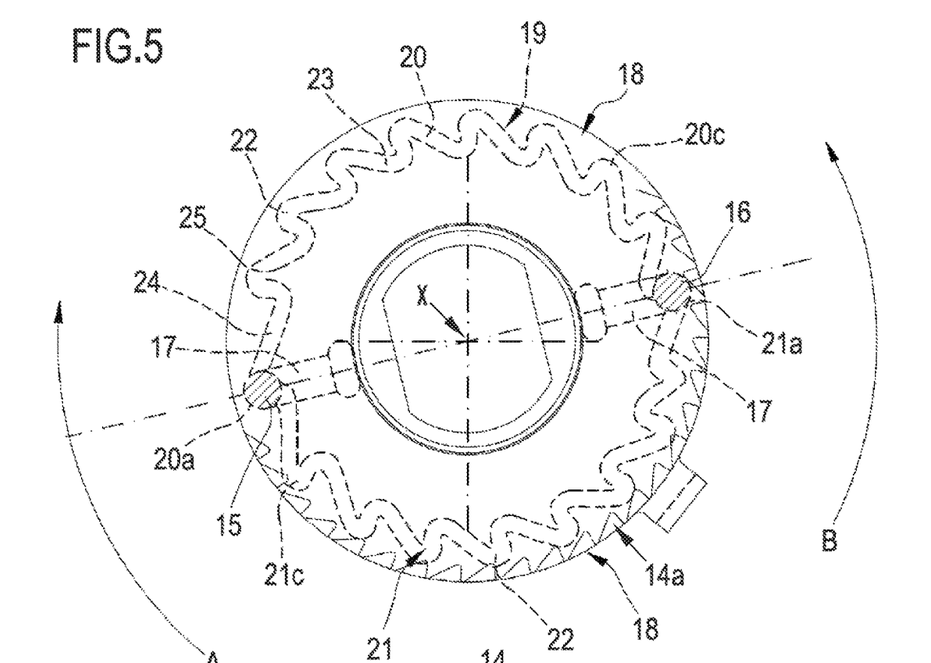
FIGS. 5 and 6 are schematic plan views of a detail of the device of FIG. 1 in two different operative conditions.
Figure 6:
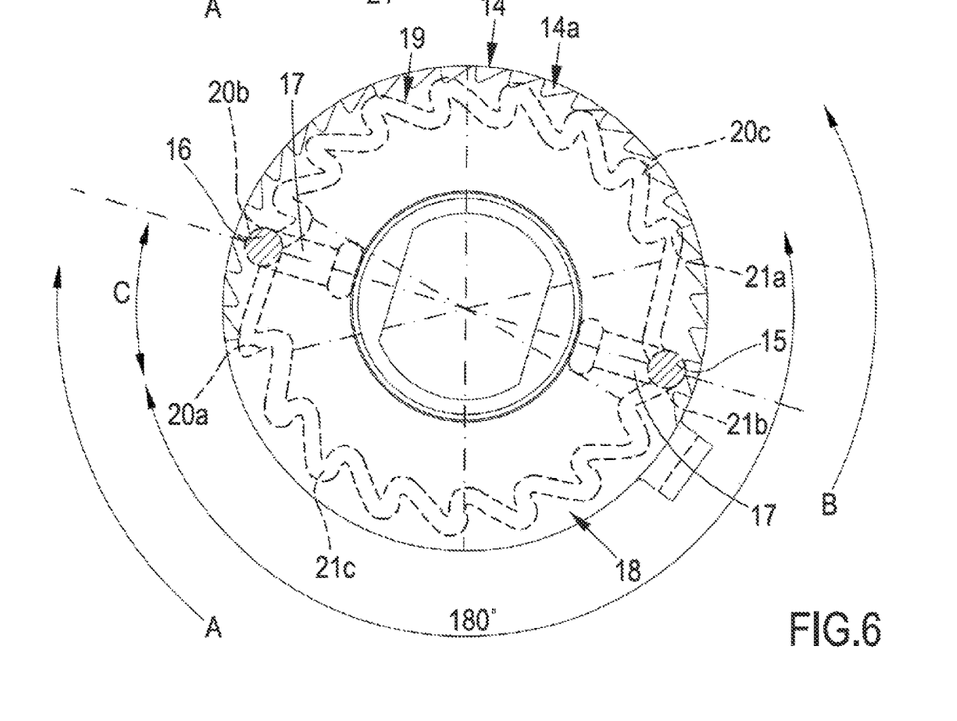
Figure 7:
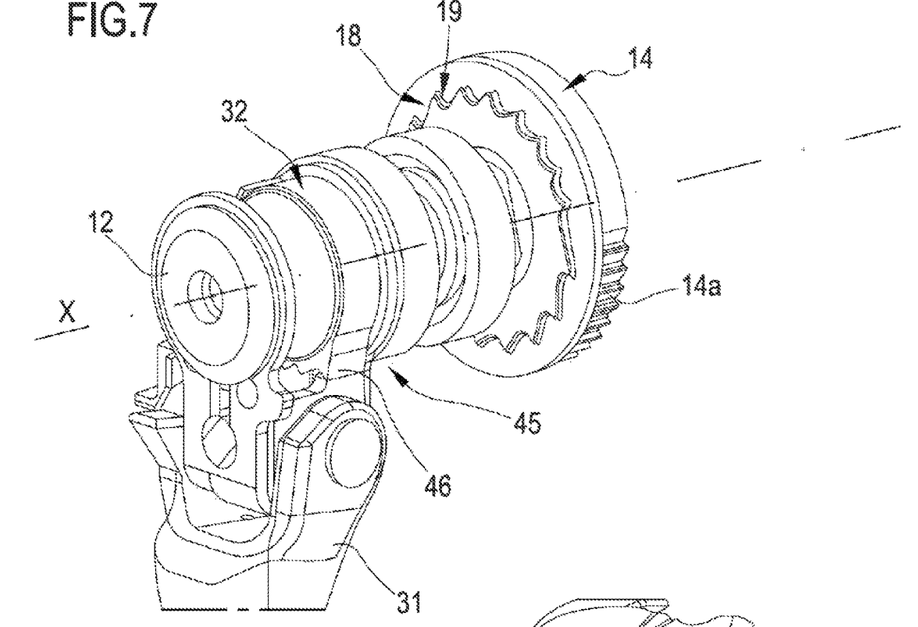
FIG. 7 is a perspective view of part of the device of FIG. 1.

Therefore, identical stop positions of the first 20 and of the second plurality of stop positions 21 are angularly spaced by 180° and engaged by the two pointers 15, 16 also angularly spaced by 180°, as schematized in FIGS. 5 and 6.

The stop positions 20, 21 are defined by a plurality of loops 22 of the fastening track 19 and are joined by a plurality of free sliding paths 23 each of which extends between two consecutive loops 22.

The free sliding paths 23 comprise a first substantially rectilinear portion 24 and a second substantially rectilinear portion 25 extending radially that joins the first portion 24 to a loop 22 (as shown in FIG. 5).

The fastening track 19 is delimited by a continuous outer peripheral margin, regularly indented due to the presence of the succession of loops 22 that define the stop positions and of the free sliding paths 23, and by an analogous inner margin.

Following the simultaneous passage of each pointer 15, 16 from one stop position to an adjacent stop position the cable-winding bush 13 performs a corresponding rotation between two adjacent angular positions.

The angular distance that separates each stop position of the first plurality of stop positions 20 and of the second plurality of stop positions 21 is angularly spaced from an adjacent stop position by a respective indexing angle C identical to the corresponding indexing angle C that separates two corresponding angular positions of the cable-winding bush 13.

Therefore, the indexing angles C that separate the stop positions of the first plurality of stop positions 20 from one another are different from each other, just as the indexing angles C that separate the stop positions of the second plurality of stop positions 21 from one another are also different from each other.

Each stop position of the first plurality of stop positions 20 corresponds to a stop position of the second plurality of stop positions 21.

As stated, angular rotations of the cable-winding bush 13 in the first angular direction A correspond to upward gearshifting operations of the rear derailleur and rotations of the cable-winding bush 13 in the second angular direction B correspond to downward gearshifting operations of the rear derailleur.

Concerning this, the device 10 comprises a maneuvering mechanism 30 operative on the central pin 12 to obtain upward or downward gearshifting.

The maneuvering mechanism 30 comprises a first control lever 31 (FIG. 2), angularly mobile about the rotation axis X in the first angular direction A between a rest position and an active position, and angularly mobile about the rotation axis X in the second angular direction B between the active position and the rest position.

Preferably, the first control lever 31 makes it possible to perform only upward gearshifting.

For this purpose, the maneuvering mechanism 30 comprises an engagement bush 32 rotating as a unit with the cable-winding bush 13 and on which the first control lever 31 acts. The first control lever 31 rotates as a unit with the engagement bush 32 in the passage from the rest position to the active position and is freely rotatable with respect to the engagement bush 32 in the passage from the active position to the rest position.

In particular, the engagement bush 32 is substantially cylindrical and comprises a toothed sector that extends radially outside of the engagement bush 32 and that comprises a plurality of teeth 33.

When the first control lever 31 is set in rotation in the first angular direction A, it engages a tooth 33 and sets the engagement bush 32 in rotation in the first angular direction A.

When the first control lever 31 rotates in the second angular direction B, it is not able to pull the teeth 33 in rotation, carrying out a return stroke into rest position without rotation of the engagement bush 32.

Elastic members (not illustrated) are active between the first control lever 31 and the casing 11, to take the first control lever 31 back into the rest position. Such elastic members can be a simple ring torsion spring, mounted in the casing 11 coaxially to the central pin 12 and constrained at one end to the casing 11 and at the other end to the first control lever 31.

The connection linkage between first control lever 31 and engagement bush 32 is per se conventional and therefore will not be described in further detail.

The maneuvering mechanism 30 further comprises a second control lever 35, which acts on the ball-holding disc 14-1 to allow a rotation thereof, together with the cable-winding bush 13, in the second angular direction B about the rotation axis X, so as to obtain downward gearshifting.

Figure 1:
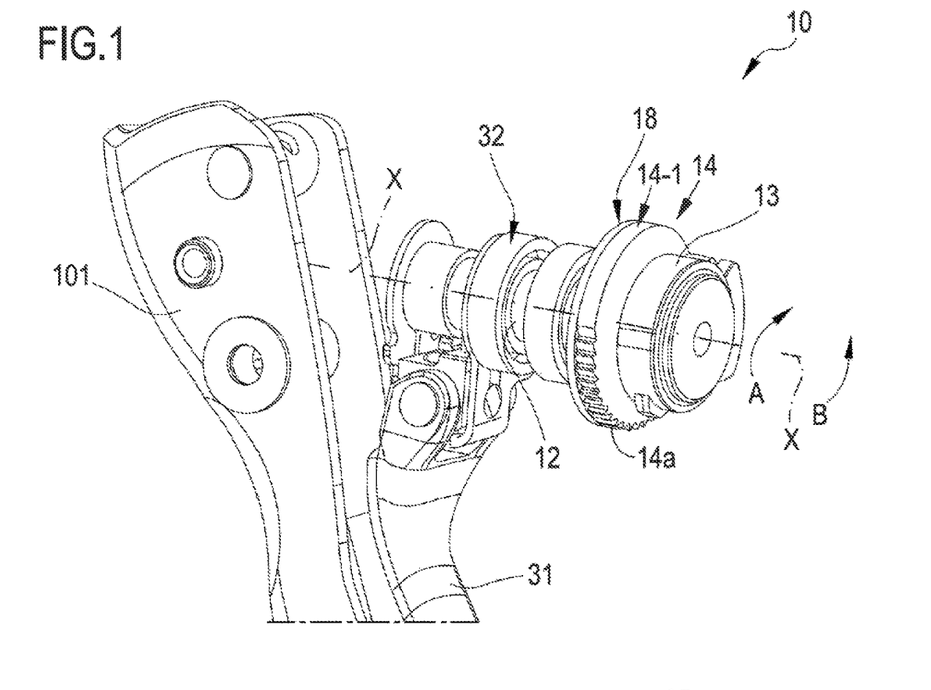
FIG. 1 is a perspective view, partially exploded and with some parts removed to better highlight others of an actuation device for the control cable of a bicycle gearshift according to the invention.
Figure 2:
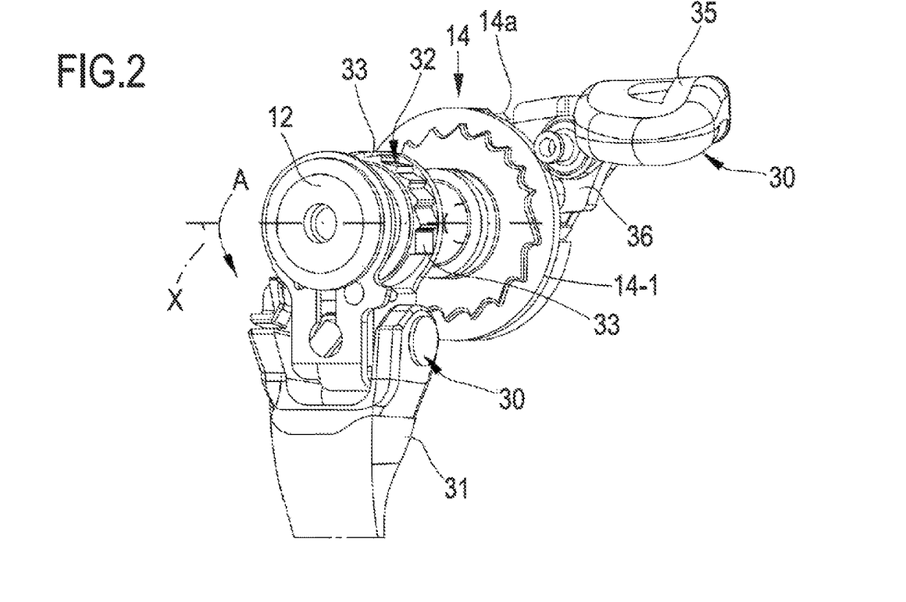
FIG. 2 is a further perspective view, partially exploded and with some parts removed to better highlight others, of the device of FIG. 1.

As shown in FIG. 2, the second control lever 35 acts on a spike 36 that acts on teeth 14a arranged radially externally on the ball-holding disc 14-1.

By actuating the second control lever 35, the spike 36 sets the ball-holding disc 14-1 in rotation in the second angular direction B. When downward gearshifting has occurred, the second control lever 35 and the spike 36 go back into the initial position through the effect of the elastic members (not illustrated), for example a torsion spring.

The downward gearshifting mechanism that uses the second control lever 35, spike 36 and toothed sector assembly is of the conventional type and is not described any further.

During upward gearshifting, the ball-holding disc 14-1 rotates with respect to the stationary member 18 in the first angular direction A and the two pointers 15, 16 slide in the fastening track along a respective free sliding path 23 that extends between two stop positions. When the pointers 15, 16 reach the stop position, the traction of the control cable positions the rear derailleur at the toothed wheel of the cog set 200 after the toothed wheel occupied previously.

During downward gearshifting, the pointers 15, 16 cannot follow the free sliding paths 23 in a rotation in the second angular direction B of the ball-holding disc 14-1, since they find a stop shoulder given by the second substantially rectilinear portion 25 extending radially of the free sliding paths 23. The action exerted by the second control lever 35 on the ball-holding disc 14-1 in the second angular direction B determines the by-passing of the pointers 15, 16 of the stop shoulders given by the respective second substantially rectilinear portions 25 and the consequent temporary disengagement of the pointers 15, 16 from the fastening track 19. In other words, the two pointers 15, 16 temporarily disengage from the fastening track 19 when the second control lever 35 is actuated. The disengagement of the pointers 15, 16 from the fastening track 19 takes place in opposition to an elastic force exerted by an elastic member (not shown) that presses the ball-holding disc 14-1 axially against the stationary member 18. At this point the rotation of the ball-holding disc 14-1 in the second angular direction B starts and the pointers 15, 16 are positioned radially towards the outside of the respective throats 17. The radially outer position of the pointers 15, 16 in the throats 17 coincides with the radial position of the stop portions on the stationary member 18. The stop positions are all arranged, on the stationary member 18, the same radial distance from the rotation axis X. When the ball-holding disc 14-1 rotates by an indexing angle C, the pointers 15, 16 reinsert in the fastening track 19 in respective stop positions making the ball-holding disc 14-1 take up a stable angular position. In this way, the cable-winding bush 13 also rotates in the second angular direction B by an indexing angle C positioning the rear derailleur at a smaller toothed wheel.

There are the same number of stop positions of the first plurality of stop positions 20 and of the second plurality of physically distinct stop positions 21 as the angular positions that the cable-winding bush 13 can take up decreased by two.

In the preferred example of the invention and represented in the attached figures, the number of stop positions of the first plurality of stop positions 20 and of the second plurality of physically distinct stop positions 21 is nine, whereas the number of angular positions of the cable-winding bush 13 (to which corresponds an equal number of toothed wheels of the cog set 200) is eleven.

In particular, a first stop position 20a, 21a of the first plurality of stop positions 20 and of the second plurality of stop positions 21, when respectively engaged by the first 15 and second pointer 16 (as schematically illustrated in FIG. 5), corresponds to the first angular position of the cable-winding bush 13 to which a position of the rear derailleur at the smallest toothed wheel 201 of the cog set 200 corresponds.

A second stop position 20b, 21b of the first plurality of stop positions 20 and of the second plurality of stop positions 21, when respectively engaged by the first 15 and second pointer 16, corresponds to the second angular position of the cable-winding bush 13 to which a position of the rear derailleur at the second smallest toothed wheel 202 of the cog set 200 corresponds.

The last stop position 20c, 21c of the first plurality of stop positions 20 and of the second plurality of stop positions 21, when respectively engaged by the first 15 and second pointer 16, corresponds to the ninth angular position of the cable-winding bush 13 to which a position of the rear derailleur at the ninth toothed wheel 209 up of the cog set 200 corresponds.

The closed loop fastening track 19 allows the first pointer 15, when arranged in the last stop position 20c of the first plurality of stop positions 20 to pass into the first stop position 21a of the second plurality of stop positions 21 when the ball-holding disc 14-1 is subjected to a rotation in the first angular direction A. At the same time, the second pointer 16, when arranged in the last stop position 21c of the second plurality of stop positions 21, passes into the first stop position 20a of the first plurality of stop positions 20.

The first stop position 20a, 21a of the first plurality of stop positions 20 and of the second plurality of stop positions 21 is therefore used twice; a first time when the cable-winding bush 13 is in the first angular position and a second time when the cable-winding bush 13 is in the tenth angular position.

The indexing angle C between the last stop position 20c of the first plurality of stop positions 20 and the first stop position 21a of the second plurality of stop positions 21 is equal to the indexing angle between the ninth and the tenth angular position of the cable-winding bush 13.

The first stop position 20a, 21a of the first plurality of stop positions 20 and of the second plurality of stop positions 21 is angularly spaced by the respective second stop position, along the first angular direction A, by an indexing angle C equal to the indexing angle C necessary to make the cable-winding bush 13 rotate from the penultimate angular position to the last angular position, in other words the angle necessary to make the rear derailleur pass from the penultimate top toothed wheel 210 to the last top toothed wheel 211.

In the example of the attached figures, the indexing angle C that separates the first stop position 20a, 21a of the first plurality of stop positions 20 and of the second plurality of stop positions 21 from the respective second stop position is equal to the indexing angle that separates the tenth angular position from the eleventh angular position of the cable-winding bush 13.

Therefore, when the second pointer 16 is in the first stop position 20a of the first plurality of stop positions 20 and the first pointer 15 is in the first stop position 21a of the second plurality of stop positions 21, a further rotation of the ball-holding disc 14-1 in the first angular direction A takes the aforementioned pointers to respectively occupy the second stop position 20b of the first plurality of stop positions 20 and the second stop position 21b of the second plurality of stop positions 21 (as schematized in FIG. 6), allowing a further upward gearshifting operation.

It should be noted that the indexing angle C that separates the first stop positions 20a, 21a from the respective second stop positions 20b, 21b, is the largest indexing angle present between two consecutive stop positions. This is since the indexing angle that takes the cable-winding bush 13 from the penultimate to the last angular position is also maximum. The remaining stop positions are separated by indexing angles C that, starting from an angle between the second angular position and the next one that is the smallest of all, increasing in size between the successive stop positions.

The device 10 further comprises a first end stop 40 to prevent the rotation of the cable-winding bush 13 in the first angular direction A beyond the last angular position.

Figure 8:
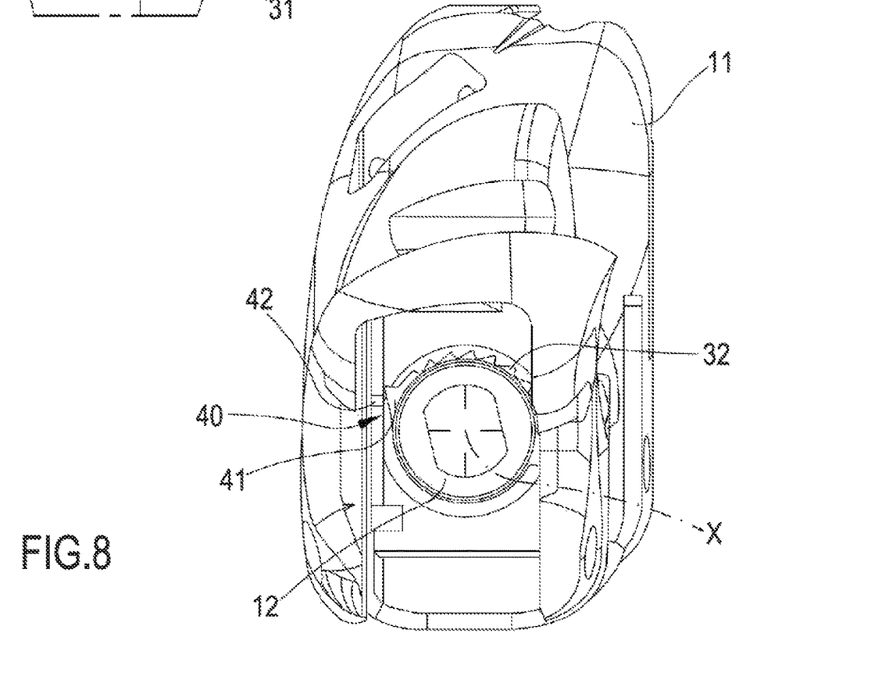
FIG. 8 is a front view with some parts removed to better highlight others of the brake-gearshift group of FIG. 4.

The first end stop 40 is active on the maneuvering mechanism 30 and comprises a first projection 41 arranged on the engagement bush 32 that interferes with a shoulder 42 fixedly connected to the casing 11 (FIG. 8) when the cable-winding bush 13 is in the last angular position, so as to prevent a rotation of the engagement bush 32 in the first angular direction A.

The device 10 comprises a second end stop 45 to prevent the rotation of the cable-winding bush 13 in the second angular direction B beyond the first angular position.

The second end stop 45 comprises a second projection 46 arranged on the engagement bush 32 that abuts the first control lever 31 in the rest position when the cable-winding bush 13 is in the first angular position, so as to prevent a rotation of the engagement bush 32 in the second angular direction B. The first control lever 31, when in the rest position, cannot indeed rotate in the second angular direction B thus acting as a stop abutment for the second projection 46 of the second end stop 45.

In the preferred embodiment of the invention, the second end stop 45 and the second projection 46 coincide.

Of course, those skilled in the art can bring numerous modifications and variants to the invention described above, in order to satisfy specific and contingent requirements, like for example providing a single plurality of stop positions engaged by a single pointer so that the cable-winding bush can perform a total rotation of 360° plus the indexing angle to pass from the first to the second angular position of the cable-winding bush, all moreover encompassed by the scope of protection of the present invention as defined by the following claims.

What is claimed is:

1. An actuation device for a control cable of a bicycle gearshift, comprising:
   a casing configured for fixing to bicycle handlebars,
   a cable-winding bush mounted in the casing angularly rotatable about a rotation axis in both:
     a first angular direction between a first angular position and a last angular position, and
     a second angular direction between the last angular position and the first angular position, a rotary member mounted in the casing in a rotary manner about the rotation axis, and a stationary member mounted in a non-rotary manner in the casing, wherein one from the rotary member or the stationary member is provided with at least one first pointer engaged on a fastening track formed on the other of the rotary or the stationary member, the fastening track extending along a closed loop path and comprising a first plurality of stop positions engageable in sequence by said at least one first pointer, the cable-winding bush rotating in at least one of the first angular direction or the second angular direction between adjacent angular positions after passage of the at least one first pointer from one stop position of the first plurality of stop positions to an adjacent stop position of the first plurality of stop positions, each stop position of the first plurality of stop positions being angularly spaced from an adjacent stop position of the first plurality of stop positions by a respective indexing angle of a plurality of indexing angles, a first stop position of the first plurality of stop positions that determines the first angular position of the cable-winding bush being angularly spaced from a next adjacent stop position of the first plurality of stop positions by a respective one of the plurality of indexing angles that rotates the cable-winding bush from a penultimate angular position to the last angular position, and each indexing angle of the plurality of indexing angles rotates the cable-winding bush by an equal amount.

2. The device according to claim 1, wherein the indexing angles between two consecutive stop positions of the first plurality of stop positions are different from each other.

3. The device according to claim 1, wherein the indexing angles between two consecutive stop positions of the first plurality of stop positions after the first stop position increase by an equal amount.

4. The device according to claim 1, wherein:

said member provided with the at least one first pointer comprises a second pointer angularly spaced by 180° from the first pointer;

the fastening track comprises a second plurality of stop positions that are the same and point-for-point diametrically opposite the first plurality of stop positions, the cable-winding bush passing from one angular position to an adjacent angular position following the simultaneous passage of each pointer from one stop position to an adjacent stop position, each stop position of the first and second plurality of stop positions being angularly spaced from an adjacent stop position by a respective indexing angle, and the first stop position of the first plurality of stop positions and a first stop position of the second plurality of stop positions that determines the first angular position of the cable-winding bush being angularly spaced from the respective next adjacent stop position by an indexing angle equal to the indexing angle sufficient to rotate the cable-winding bush from the penultimate angular position to the last angular position.

5. The device according to claim 4, wherein said closed loop path of said fastening track is formed by a plurality of loops, which define said plurality of stop positions of the first and of the second plurality of stop positions, and a plurality of free sliding paths each of which extends between two consecutive loops.

6. The device according to claim 5, wherein said free sliding paths comprise a first substantially rectilinear portion and a second substantially rectilinear portion extending radially that joins the first substantially rectilinear portion to a loop of the plurality of loops.

7. The device according to claim 4, wherein the rotary member is a ball-holding disc comprising a first and a second throat that are substantially rectilinear extending radially and angularly separated by 180°, the first and the second throat slidably receiving a respective one of the first and second pointers.

8. The device according to claim 7, wherein said first and second pointer emerge axially from said throats to slidably engage said fastening track.

9. The device according to claim 4, wherein said fastening track is formed on said stationary member and said rotary member comprises a ball-holding disc on which said pointers are slidably provided.

10. The device according to claim 4, wherein a number of stop positions of the first plurality of stop positions and the second plurality of stop positions are equal to each other and two less than a number of angular positions of the cable-winding bush.

11. The device according to claim 4, further comprising a first end stop to prevent the rotation of the cable-winding bush in the first angular direction beyond the last angular position.

12. The device according to claim 11, further comprising a second end stop to prevent the rotation of the cable-winding bush in the second angular direction beyond the first angular position.

13. The device according to claim 12, further comprising a maneuvering mechanism operative on the cable-winding bush to rotate the cable-winding bush in the first angular direction, said first end stop being active on said maneuvering mechanism.

14. The device according to claim 1, further comprising a maneuvering mechanism that comprises:

a first control lever, angularly mobile about the rotation axis in the first angular direction between a rest position and an active position, and angularly mobile about the rotation axis in the second angular direction between the active position and the rest position, an engagement bush rotating as a unit with the cable-winding bush and on which said first control lever acts, said first control lever rotating as a unit with said engagement bush during passage from the rest position to the active position and being freely rotatable with respect to said engagement bush during passage from the active position to the rest position.

15. The device according to claim 14, wherein a first end stop comprises a first projection arranged on said engagement bush that interferes with a shoulder fixedly connected to said casing when the cable-winding bush is in the last angular position, so as to prevent a rotation of the engagement bush in the first angular direction.

16. The device according to claim 15, wherein a second end stop comprises a second projection arranged on said engagement bush that abuts the first control lever when the cable-winding bush is in the first angular position, so as to prevent a rotation of the engagement bush in the second angular direction.

17. An actuation device for a bicycle gearshift control cable, the actuator device comprising:

a casing configured for fixing to bicycle handlebars, a cable-winding bush mounted in said casing and angularly rotatable about a rotation axis in a first angular direction between a first angular position and a last angular position and in a second angular direction between said last angular position and said first angular position, a rotary member mounted in said casing and rotatable about said rotation axis and a stationary member mounted in said casing, wherein one from said rotary member or said stationary member is provided with at least two pointers angularly spaced by 180° and engaged on a fastening track formed on the other of said rotary member or said stationary member, said fastening track extending along a closed loop path and comprising:

a first plurality of stop positions and a second plurality of stop positions that are identical to each other and point-for-point diametrically opposite said stop positions of said first plurality of stop positions and engageable in sequence by one of said at least two pointers, said cable-winding bush rotating in one of the first angular direction or the second angular direction between adjacent angular positions after passage of at least one of said at least two pointers from a respective stop position to an adjacent stop position of at least one of the first plurality of stop positions or the second plurality of stop positions, each stop position of at least one of the first plurality of stop positions or the second plurality of stop positions being angularly spaced from an adjacent stop position of at least one of the first plurality of stop positions or the second plurality of stop positions by a respective indexing angle of a plurality of indexing angles, each indexing angle of the plurality of indexing angles corresponding to an equal amount of rotation of said cable-winding bush, a first stop position among said first plurality of stop positions and said second plurality of stop positions that determines a first angular position of said cable-winding bush that is angularly spaced from a next adjacent stop position by a predetermined indexing angle from the plurality of indexing angles that rotates said cable-winding bush from a penultimate angular position to said last angular position, and a first end stop that prevents rotation of said cable-winding bush in said first angular direction beyond said last angular position.

\* \* \* \* \*